United States Patent
Hamaya et al.

(10) Patent No.: US 8,763,733 B2
(45) Date of Patent: Jul. 1, 2014

(54) INVERTED PENDULUM TYPE VEHICLE

(75) Inventors: Kazushi Hamaya, Saitama (JP); Hiroshi Gomi, Saitama (JP); Joonheon Shin, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/496,488

(22) PCT Filed: Sep. 18, 2009

(86) PCT No.: PCT/JP2009/004745
§ 371 (c)(1),
(2), (4) Date: Mar. 15, 2012

(87) PCT Pub. No.: WO2011/033583
PCT Pub. Date: Mar. 24, 2011

(65) Prior Publication Data
US 2012/0168236 A1    Jul. 5, 2012

(51) Int. Cl.
  B62K 15/00   (2006.01)
  B62K 1/00    (2006.01)
  B62J 1/00    (2006.01)
(52) U.S. Cl.
  CPC . B62K 1/00 (2013.01); B62J 1/005 (2013.01); B62K 2015/003 (2013.01); B62K 15/00 (2013.01)
  USPC ............................................. 180/21; 180/208
(58) Field of Classification Search
  CPC .... B62K 17/00; B62K 1/00; B62K 2015/003; B62K 15/00; B62D 61/00; B62J 1/005; B62J 1/10
  USPC ......... 180/21, 6.2, 6.24, 6.5, 6.58, 65.51, 208
  See application file for complete search history.

(56) References Cited

U.S. PATENT DOCUMENTS

| | | | | |
|---|---|---|---|---|
| 627,596 | A * | 6/1899 | Shutte | 280/205 |
| 2,971,773 | A * | 2/1961 | McKissick | 280/205 |
| 7,159,681 | B1 * | 1/2007 | Sauve | 180/208 |
| 7,303,032 | B2 * | 12/2007 | Kahlert et al. | 180/65.1 |
| 7,543,834 | B2 * | 6/2009 | Goczey et al. | 280/205 |
| 7,690,447 | B2 * | 4/2010 | Kamen et al. | 180/21 |
| 7,866,429 | B2 | 1/2011 | Ishii et al. | |
| 8,028,777 | B2 * | 10/2011 | Kakinuma et al. | 180/65.1 |
| 8,201,653 | B2 * | 6/2012 | Strassman | 180/218 |

(Continued)

FOREIGN PATENT DOCUMENTS

| JP | 2004-074814 A | 3/2004 |
|---|---|---|
| JP | 2004074814 A * | 3/2004 |

(Continued)

*Primary Examiner* — Joseph M Rocca
*Assistant Examiner* — Timothy Wilhelm
(74) *Attorney, Agent, or Firm* — Carrier Blackman & Associates, P.C.; William D. Blackman; Michael J. McCandlish

(57) ABSTRACT

In an inverted pendulum type vehicle including a frame (2) incorporated with a propulsion unit (3) and a seat unit (4) provided on the frame, the seat unit (4) is moveable between a deployed position for supporting a rider and a retracted position different from the deployed position. Thereby, an object support unit for supporting an object such as a rider and a cargo can be positioned differently depending on the need so that the convenience and freedom in the use of the vehicle can be enhanced by preventing the object support unit from encumbering the user when not in use.

3 Claims, 10 Drawing Sheets

(56) References Cited

U.S. PATENT DOCUMENTS

| | | |
|---|---|---|
| 2011/0067936 A1* | 3/2011 | Takenaka et al. ............... 180/21 |
| 2011/0067938 A1* | 3/2011 | Gomi et al. .................... 180/21 |
| 2011/0209932 A1 | 9/2011 | Takenaka et al. |

FOREIGN PATENT DOCUMENTS

| | | |
|---|---|---|
| JP | 2005-162060 A | 6/2005 |
| JP | 2008-253565 A | 10/2008 |
| WO | 2008/139740 A1 | 11/2008 |

* cited by examiner

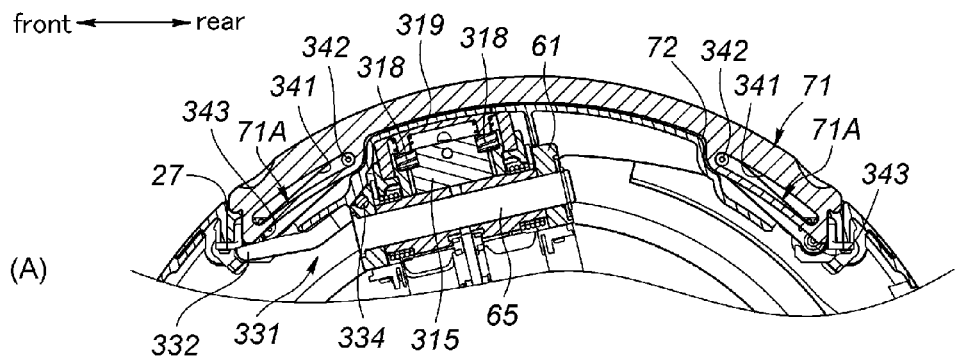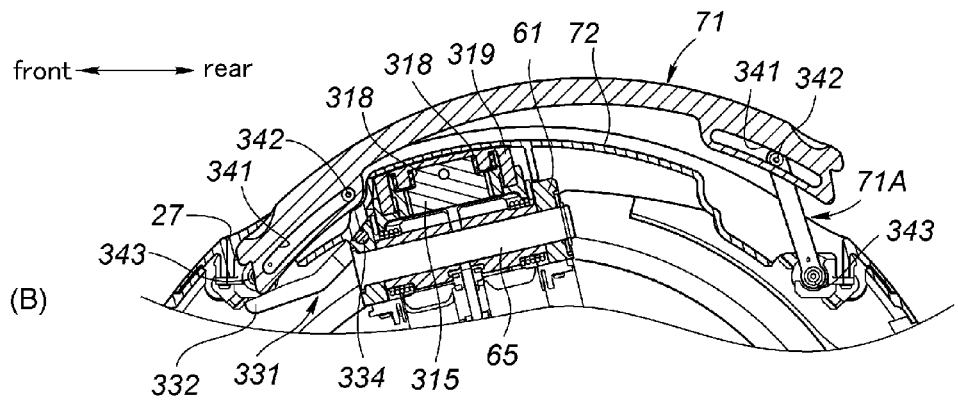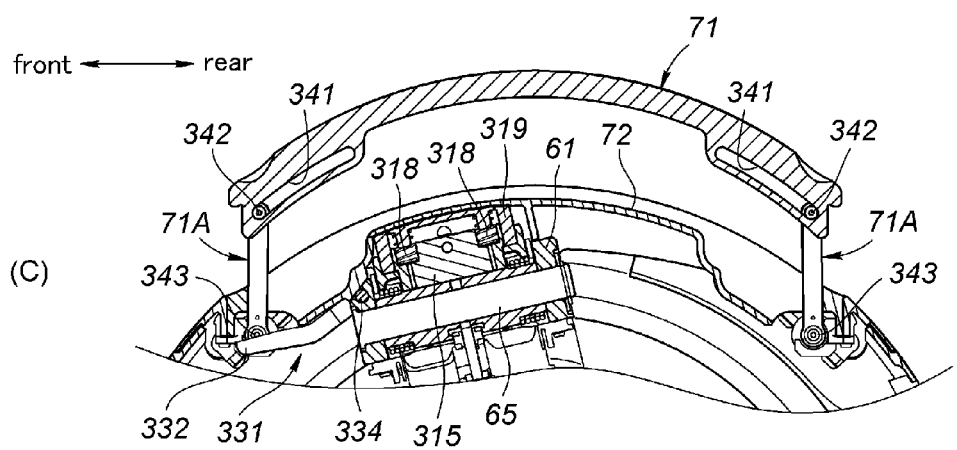
Fig.9

INVERTED PENDULUM TYPE VEHICLE

TECHNICAL FIELD

The present invention relates to an inverted pendulum type vehicle configured to be propelled by a wheel or the like.

BACKGROUND OF THE INVENTION

A known inverted pendulum type vehicle comprises a plurality of wheels actuated by an electric motor, a step for supporting the feet of a rider, a handle bar for the rider extending upright from the step and a seat for seating the rider, and the upright attitude of the vehicle is maintained by performing an inverted pendulum control on the electric motor. (See Patent document 1, for instance.)

PRIOR ART DOCUMENT(S)

Patent Document(s)

Patent document 1: JP 2008-253565

BRIEF SUMMARY OF THE INVENTION

Task to be Accomplished by the Invention

According to the inverted pendulum type vehicle disclosed in Patent document 1, the seat is provided on a seat support part connected to the handle bar so that the rider sits on the seat and operates the vehicle by holding the handle bar. It is therefore difficult for the rider to operate the vehicle while standing up on the step without using the seat. Even when the rider has managed to stand up on the step, the seat obstructs the rider to get off or on the vehicle. This conventional inverted pendulum type vehicle may be provided with a support part for supporting cargo, instead of a seat. However, such a support part would inconvenience the rider when the support part is not being used, and impairs the convenience and versatility of the vehicle.

In view of such problems of the prior art, a primary object of the present invention is to provide an inverted pendulum type vehicle that allows an arrangement of an object support part provided on a base member supporting a propulsion unit to support a rider and/or cargo to be changed depending on each given circumstance so that the support part may not inconvenience the rider when the support part is not being used, and improves the convenience and versatility of the vehicle.

Means to Accomplish the Task

To achieve such an object of the present invention, a first aspect of the present invention provides an inverted pendulum type vehicle, comprising: a base frame (2) supporting a propulsion unit (3); and an object support unit (4) mounted on the base frame and configured to support an object; wherein the object support unit is moveable between a first position for supporting the object and a second position different from the first position.

According to a second aspect of the present invention, the vehicle may further comprise a step unit mounted on the base frame for supporting both feet of a rider; wherein the object support unit comprises a seat unit (4) for supporting hips of the rider, and the second position consists of a retracted position that stows at least a part of the seat unit in the base frame.

According to a third aspect of the present invention, the seat unit comprises a seating surface (70La, 70Ra) engaging the hips of the rider, and the seating surface is exposed from a surrounding wall of the base frame when the seat unit is in the retracted position.

According to a fourth aspect of the present invention, the step unit comprises a left step (183L) and a right step (183R) extending leftward and rightward from the base frame, respectively, so as to correspond to the left and right feet of the rider, and the seat unit comprises a left saddle part (63L) and a right saddle part (63R) supporting the left hip and right hip of the rider, respectively, the seating surface of each of the saddle parts being exposed from a corresponding side wall of the base frame when the saddle unit is in the retracted position.

Effect of the Invention

According to the first aspect of the present invention, because the object support unit for supporting a rider or cargo is moveable (between a first position and a second position) depending on the need, the object support unit is avoided from encumbering the user when not in use so that the convenience and versatility of the vehicle can be improved.

According to the second aspect of the present invention, the user is enabled to choose between a sitting posture by using the seat unit and a standing posture by using the step unit, instead of the seat unit (or by moving the seat unit to the second position so as to be moved out of the way of the user) as desired.

According to the third aspect of the present invention, the storage space for the seat unit in the base frame is not required to be provided with a lid or the like so that the structure of the storage space for the seat unit can be simplified. By making the seating surface that is exposed from the base frame from soft material, the seating surface exposing from the base frame contributes to the protection of the rider and other surrounding objects.

According to the fourth aspect of the present invention, by gripping the seating surfaces of the left and right saddle parts that are exposed from either side of the base frame with the legs (knees or thighs) of the rider, the rider is enabled to ride the vehicle in the standing posture in a highly stable manner.

BRIEF DESCRIPTION OF THE DRAWINGS

FIGS. 9(A) to 9(C) are fragmentary sectional views showing the movement of a grip handle from a retracted position to a deployed position.

DETAILED DESCRIPTION OF THE PREFERRED EMBODIMENTS

Figure 1:
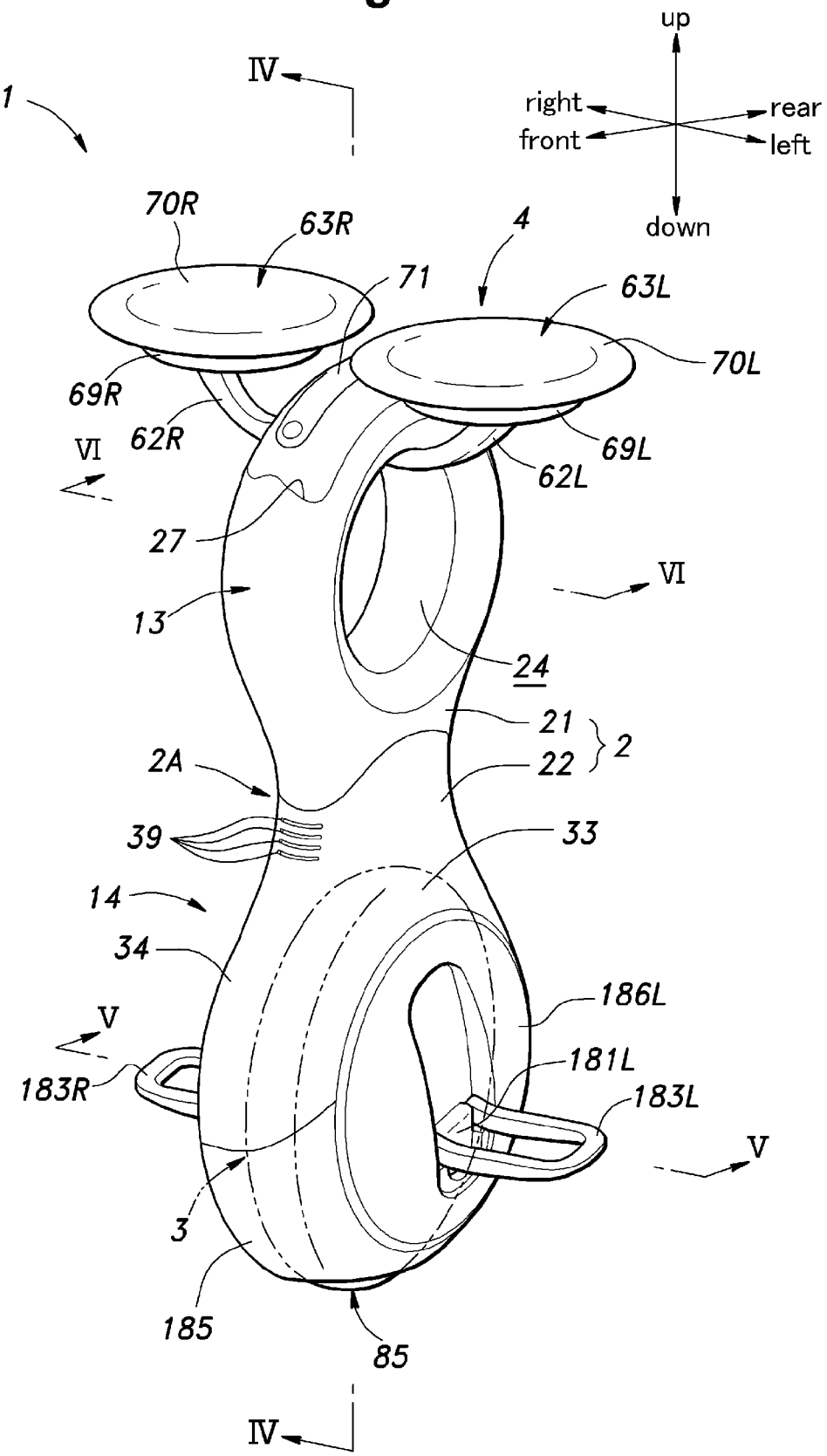
FIG. 1 is a perspective view of an inverted pendulum type vehicle embodying the present invention which is put ready for boarding (with a saddle and steps deployed)

An inverted pendulum type vehicle 1 embodying the present invention is described in the following with reference to the appended drawings. In the following description, the orientation and direction of the inverted pendulum type vehicle and components thereof are defined as indicated by the arrows representing the vertical, fore and aft and lateral directions in the drawings.

<Overall Structure of the Inverted Pendulum Type Vehicle>

Referring to FIG. 1 and FIGS. 3 to 5, the inverted pendulum type vehicle (vehicle) 1 includes a frame 2 consisting of a base frame forming a vertically extending frame structure, a propulsion unit 3 provided in a lower part of the frame 2, a seat unit 4 provided in an upper part of the frame 2 to support an object, an electric unit 11 provided in the frame 2 and a battery unit 10 for supplying electric power to the various units and sensors. The electric unit 11 includes an inverted pendulum control unit (which is referred to simply as a control unit in the following description) 5, a load sensor 6 and a tilt sensor 7. The control unit 5 controls the operation of the propulsion unit 3 according to the input signals from the various sensors according to an inverted pendulum control, and maintains the vehicle 1 in an upright posture. The vehicle 1 is provided with strain sensors 8L and 8R and rotary encoders 9L and 9R in appropriate parts thereof, separately from the electric unit 11.

<Structure of the Frame>

Figure 3:
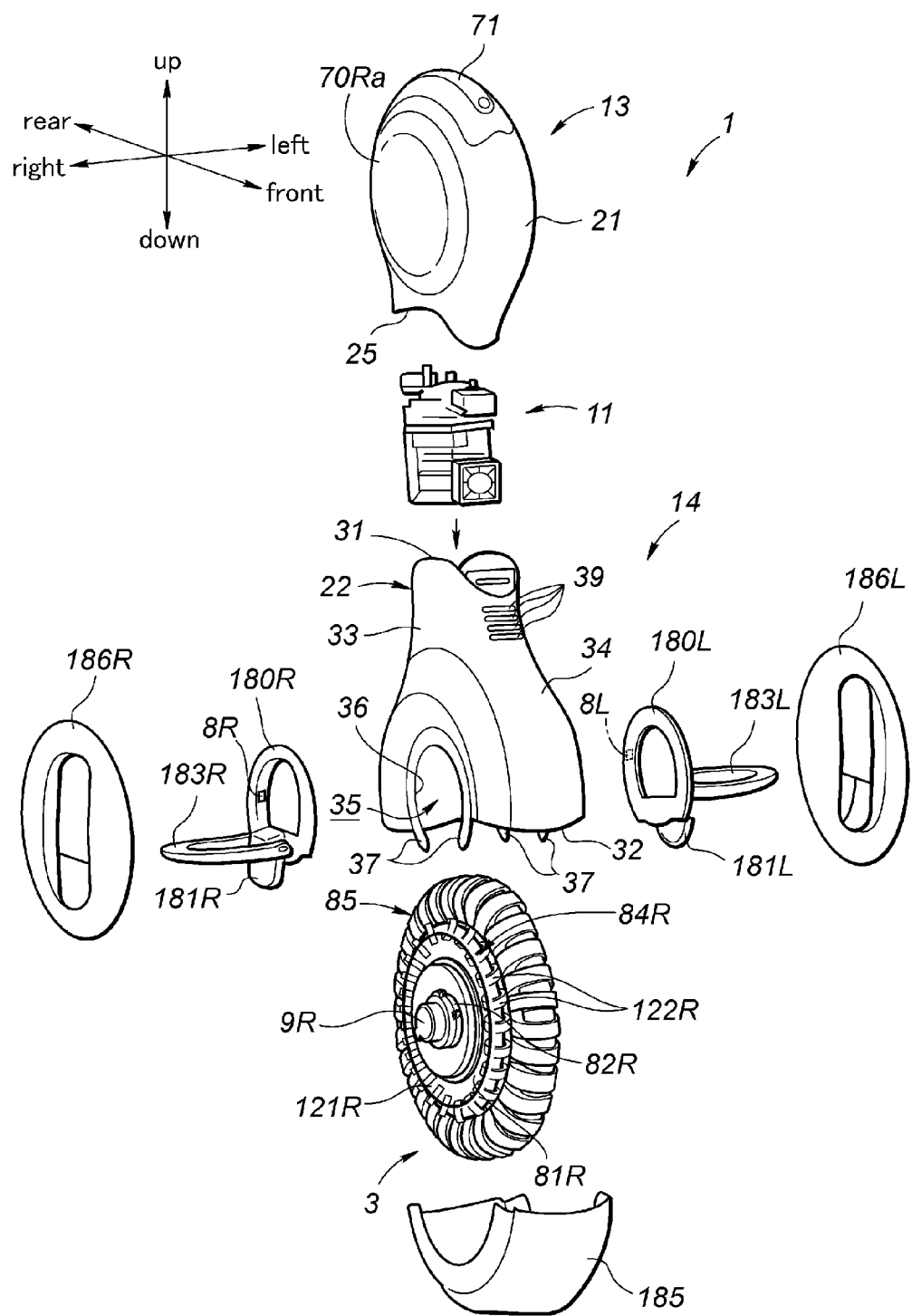
FIG. 3 is an exploded perspective view of the inverted pendulum type vehicle.

As shown in FIG. 1, the frame 2 consists of a hollow shell structure, and is given with a flattened shape by being more elongated in the fore and aft direction than in the lateral direction. The frame 2 is provided with a narrowed portion 2A in a vertically middle part thereof. The narrowed portion 2A is reduced in the fore and aft dimension as compared to other parts of the frame 2, and is internally receives the electric unit 11 therein. The frame 2 is thus provided with the shape of numeral "8" as seen from the side. As shown in FIG. 3, the frame can be separated into an upper frame 21 and a lower frame 22 at the narrowed portion 2A. The upper frame 21 and the lower frame 22 are made of dry carbon (carbon fiber reinforced plastic: CFRP) prepared by thermally curing an appropriately shaped carbon prepreg sheet. As will be discussed hereinafter, the upper frame 21 and the lower frame 22 are connected to each other via the load sensor 6.

Figure 4:
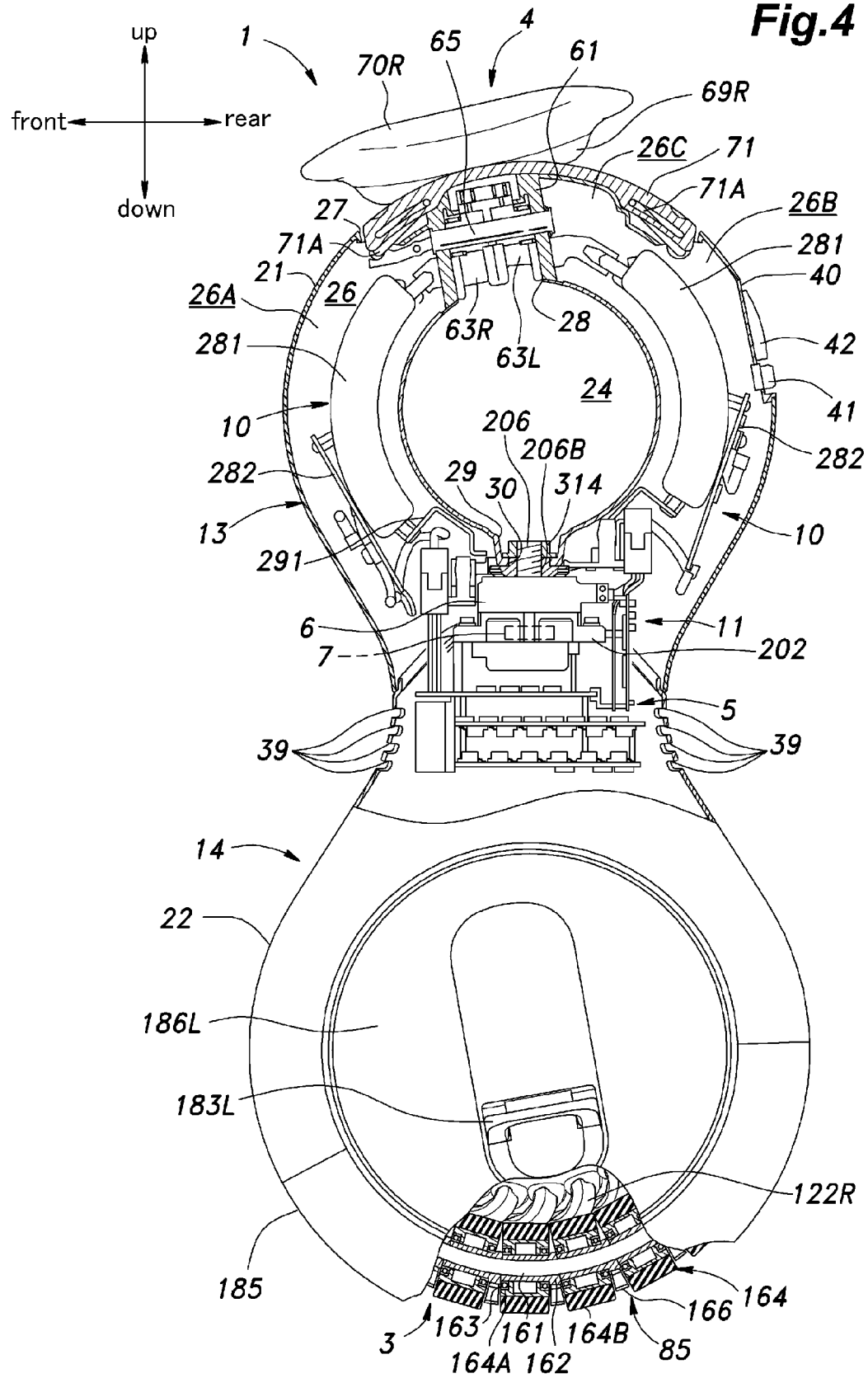
FIG. 4 is a sectional view taken along line IV-IV of FIG. 1.

As shown in FIG. 4, the upper frame 21 is shaped in an annular shape so that a saddle storage space 24 may be laterally passed through a central part thereof. This annular shaped part is provided with a hollow interior defining an internal space 26 for receiving the battery unit 10 or the like. The lower end of the upper frame 21 is formed with a lower opening 25 (see FIG. 3) that faces downward, and the upper end of the upper frame 21 is formed with an upper opening 27 that faces upward. The upper wall of the saddle storage space 24 is provided with a saddle mounting hole 28 communicating the internal space 26 with the saddle storage space 24. The lower wall of the saddle storage space 24 is formed with a connecting recess 29 recessed downward from the saddle storage space 14. The bottom of the connecting recess 29 is centrally formed with a connecting hole 30 that is passed across the lower wall. In this vehicle 1, a front internal space 26A and a rear internal space 26B of the internal space 26 of the upper frame 21 forms an annular battery storage space for receiving the battery unit 10 therein.

As shown in FIG. 3, the lower frame 22 is provided with an upper opening 31 and a lower opening 32 so as to define a tubular shape. The lower frame 22 is provided with a pair of side walls 33 extending vertically in a mutually parallel relationship. The lower frame 22 is also provided with front and rear walls 34 which diverges in the fore and aft direction as one moves from the upper part thereof to the lower part thereof, and the lower part of the lower frame 22 is provided with a semi-circular shape as seen from a side. The semi-circular lower part of the lower frame 22 defines a storage space 35 for receiving an upper half of the propulsion unit 3.

Each side wall 33 is formed with a semi-circular notch 36 connected to the lower opening 32. The two notches 36 are coaxially disposed to each other with respect to a laterally extending axial line. At the boundary between each notch 36 and the lower opening 32 is provided a pair of projecting pieces 37 that form circumferential extensions of the periphery of the notch 36. An upper part of each of the front and rear walls 34 adjacent to the narrowed portion 2A is formed with ventilation slots 39 which are each laterally elongated and are arranged vertically in a mutually parallel relationship.

Figure 7:
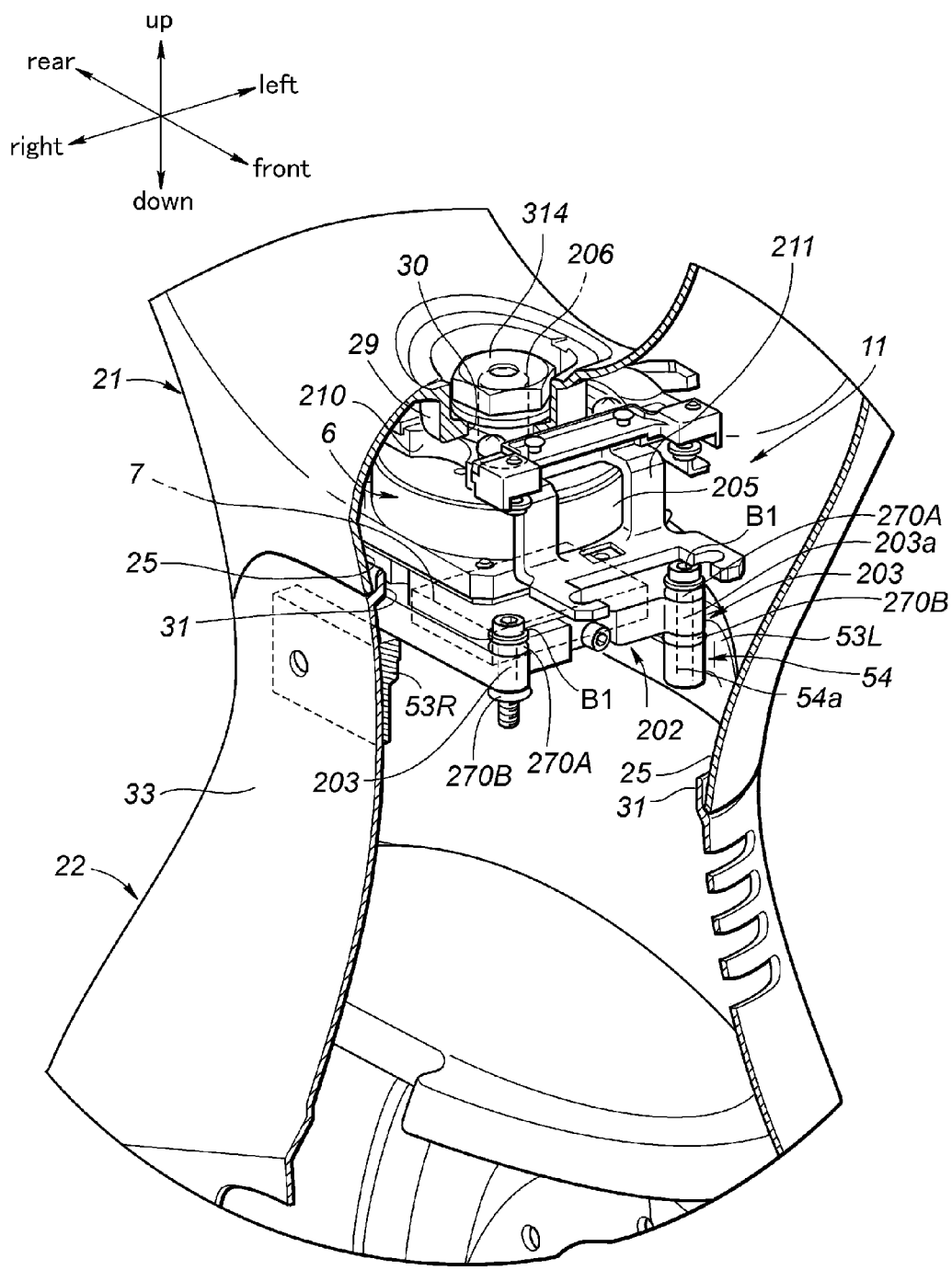
FIG. 7 is a partly broken away perspective view showing a narrowed portion of the inverted pendulum type vehicle.

As shown in FIG. 7, a metallic support base 53L, 53R is bonded to the inner surface of each side wall 33 of the lower frame 22 adjacent to the upper opening 31. Each metallic support base 53L, 53R extends in the fore and aft direction, and defines a horizontal upper surface. Each of the front and rear ends of each support base 54 forms a connecting portion 54 having a female thread hole 54 passed vertically therethrough.

<Structure of the Seat Unit>

Figure 6:
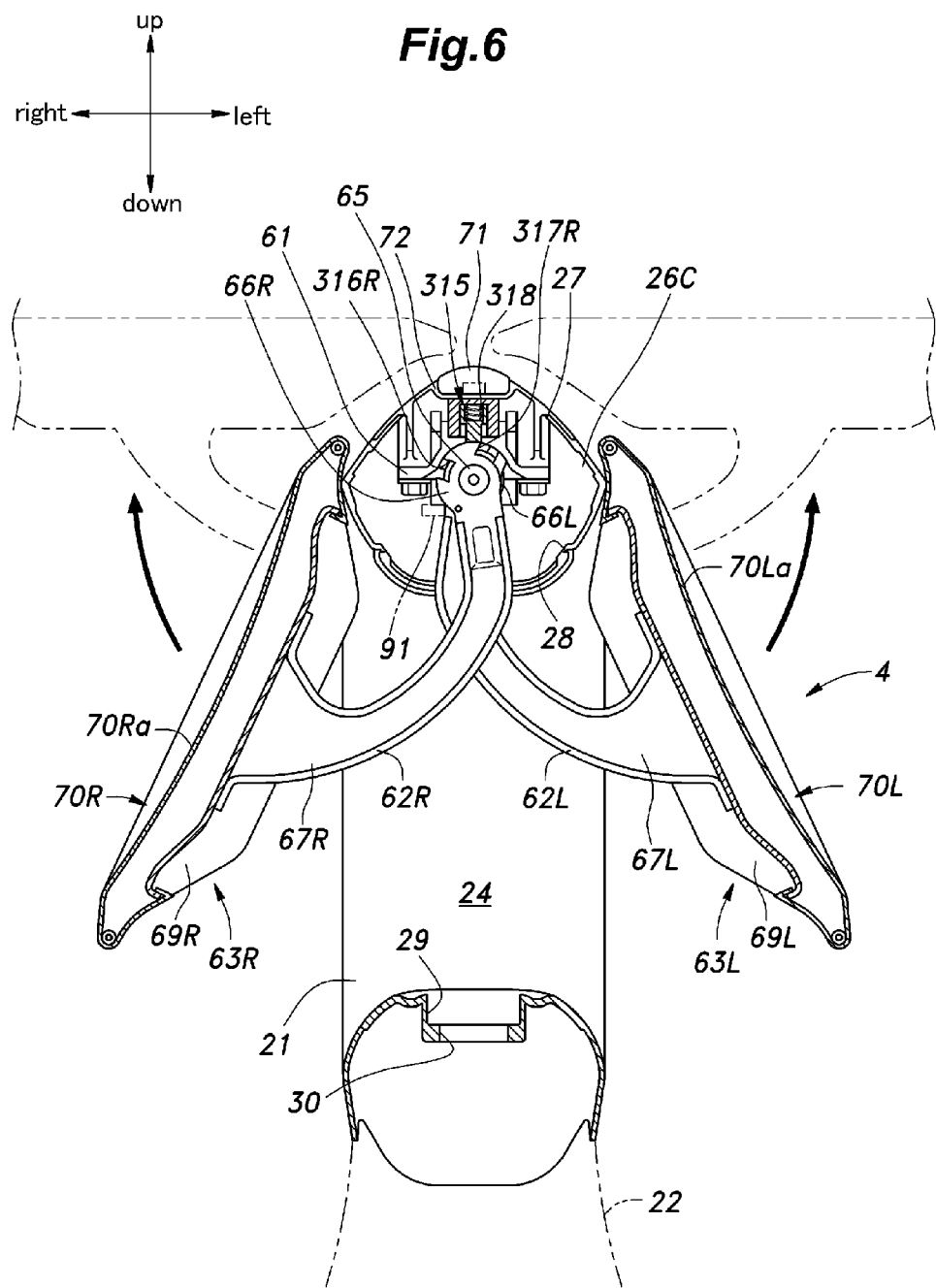
FIG. 6 is a sectional view taken along line VI-VI of FIG. 1.

As shown in FIG. 6, the seat unit 4 comprises a base main body 61, a pair of saddle arms 62L and 62R and a pair of saddle parts 63L and 63R. The base main body 61 is placed in an upper internal space 26C from the upper opening 27 of the upper frame 21, and closes the upper opening 27 with an upper wall connected to the base main body 61. The base main body 61 is provided with a support shaft 65 extending in the fore and aft direction in a lower part thereof.

The support shaft 65 pivotally supports base ends 66L and 66R of the saddle arms 62L and 62R. Each saddle arm 62L, 62R extends from the base end thereof 66L, 66R through a saddle mounting hole 28 of the upper frame 21, and is provided with a free end 67L, 67R located outside of the upper frame 21. The right saddle arm 62R is rotatable between a retracted position (second position) where the free end thereof 67R is located in a part of the saddle storage space 24 lower than the base end thereof 66R, and a deployed position (first position) where the free end 67R is located to the right of the base end 66R. The right saddle arm 62R is curved in such a manner that a convex side thereof faces downward at the deployed position. The left saddle arm 62L, which is substantially symmetric to the right saddle arm 62R, is also rotatable between a retracted position (second position) and a deployed position (first position), and is curved so that a convex side thereof faces downward, in a similar fashion.

Figure 8:
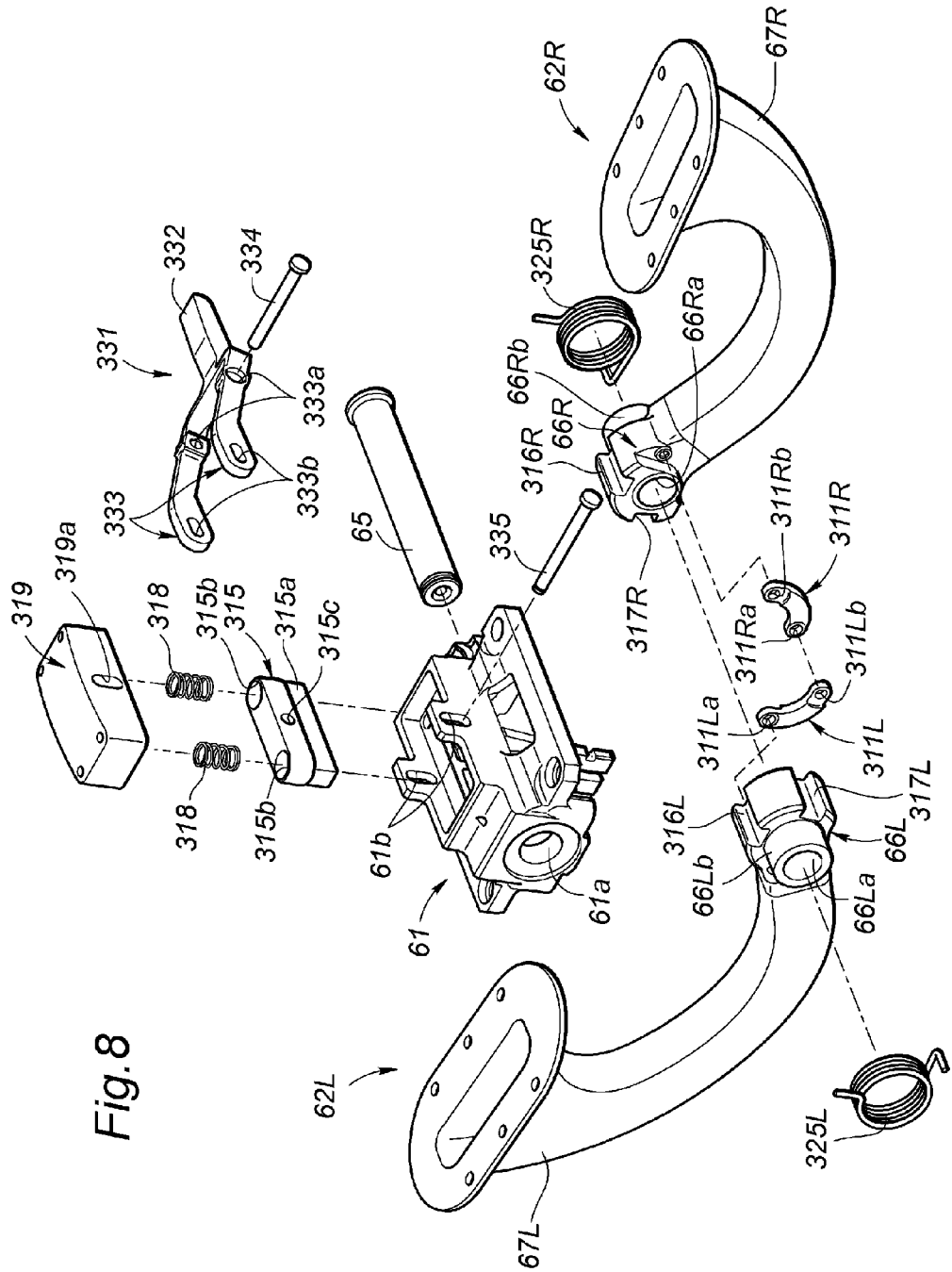
FIG. 8 is an exploded perspective view showing an essential part of a saddle support structure of a seat unit of the inverted pendulum type vehicle.

The two saddle arms 62L and 62R are connected to each other via a link mechanism which causes one of the saddle arms to be retracted when the other saddle arm is retracted, and one of the saddle arms to be deployed when the other saddle arm is deployed. As shown in FIG. 8, this link mechanism includes a pair of arcuate link bars 311L and 311R that connect the base ends 66L and 66R of the two saddle arms 62L and 62R to each other. The two link bars 311L and 311R are substantially identically shaped, and are pivotally connected to the base end 66L of the left saddle arm 62 via a shaft member (not shown in the drawings) passed through shaft holes 311La and 311Ra formed in the one ends of the two link bars 311L and 311R so as to be rotatable with respect to the base main body 61. The left link bar 311L is rotatably connected to the base end 66L of the left saddle arm 62L via a shaft member (not shown in the drawings) passed through a shaft hole 311Lb formed in the other end thereof. Similarly, the right link bar 311R is rotatably connected to the base end 66R of the right saddle arm 62R via a shaft member (not shown in the drawings) passed through a shaft hole 311Rb formed in the other end thereof.

The seat unit 4 is provided with a lock mechanism for retaining the saddle arms 62L and 62 at prescribed positions. As shown in FIG. 8, this lock mechanism essentially consists of a lock member 315 having a downwardly projection key 315a and first groove 316L, 316R and a second groove 317L, 316R formed in the base end 66L, 66R of each saddle arm 62L, 62R. The lock member 315 is held within the base main body 61 by a holding member 319. The lock member 315 is resiliently urged downward by a pair of compression springs 318 received in respective spring holding holes 315b.

Figure 2:
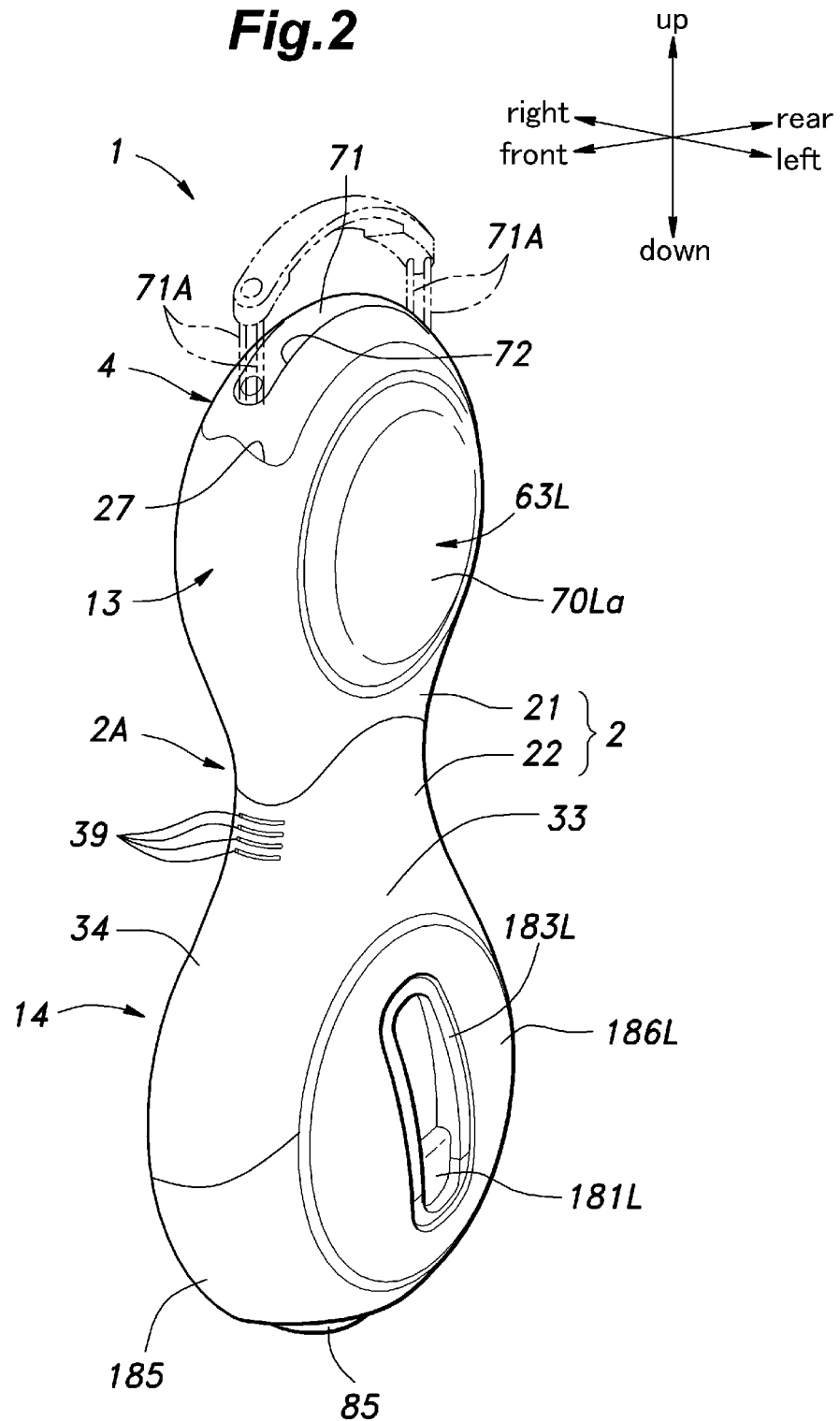
FIG. 2 is a perspective view of the inverted pendulum type vehicle (with the saddle and the steps retracted)

When each saddle arm 62L, 62 is to be brought to the deployed position (double-dot chain-dot lines in FIG. 6), the first groove 316L, 316R of the base end 66L, 66R moves upward, and the key 315a of the lock member 315 fits into the first groove 316L, 316R. When each saddle arm 62L, 62 is to be brought to the retracted position (FIG. 2), the second groove 317L, 316R of the base end 66L, 66R moves upward, and the key 315a of the lock member 315 fits into the second groove 317L, 316R. Owing to this lock mechanism, the two saddle arms 62L and 62R can be retained at each of the deployed and retracted positions in a stable manner.

The base ends 66L and 66R of the saddle arms 62L and 62R are attached to the base main body 61 by means of a support shaft 65 which is passed through holes 66La and 66Ra of the saddle arms 62L and 62R and a hole 61a of the base main body 61. A spring retaining portion 66Lb, 66Rb provided in the base end 66L, 66R of each saddle arm 62L, 62R is fitted with a torsion coil spring 325L and 325R which normally urges the corresponding saddle arm 62L, 62R to the deployed position.

The seat unit 4 is provided with a lock release member 331 for lifting the lock member 315 against the biasing force of the compression coil springs 318. The lock release member 331 includes a lever portion 332 in a front part thereof and a pair of arms 333 bifurcating from the rear end of the lever portion 332. The arms 333 are pivotally supported by the upper frame 21 via a pin member 334 passed through holes 333a formed in intermediate parts thereof. A rear end part of each arm 333 is formed with a slot 333b extending in the longitudinal direction, and a vertically elongated slot 61b is formed in an upper part of each of the front and rear walls of the base main body 61. The lock member 315 is formed with a through hole 315c, and the holding member 319 is also formed with a through hole 319a. A pin member 335 is passed through the longitudinally elongated slots 333b, the vertically elongated slot 61b and the through holes 319a and 315c.

Thereby, when the lock release member 331 is tilted around the pin member 334 so as to cause the arms 333 to be raised, the lock member 315 is caused to be lifted against the spring from the compression coil springs 318. As a result, the key 315a of the lock member 415 are dislodged from the first grooves 316L and 316R or the second grooves 317L and 317R. As a result, the two saddle arms 62L and 62R are released from engagement. Because the two saddle arms 62L and 62R are urged by the torsion coil springs 325L and 325R toward the deployed position, the user is enabled to move the two saddle arms 62L and 62R from the retracted position to the deployed position without any effort.

As shown in FIG. 6, each saddle part 63L, 63R includes a support portion 69L, 69R at the free end 67L, 67R of the corresponding saddle arm 62L, 62R and a disk shaped cushion portion 70L, 70R fitted on the corresponding support portion 69L, 69R. Each cushion portion 70L, 70R is provided with a seating surface 70La, 70Ra for placing the corresponding hip or thigh of the user (or the rider). When the saddle arms 62L and 62R are in the deployed position (as indicated by the double-dot chain-dot line in FIG. 6), each cushion portion 70L, 70R is located above the corresponding support portion 69L, 69R, and each seating surface 70La, 70Ra faces upward. The load of the rider D seated on the seat unit 4 (see FIG. 10(A)) is applied to the upper frame 21 via the saddle parts 63L and 63R, the saddle arms 62L and 62R and the base main body 61.

When the saddle arms 62L and 62R are in the retracted position (See FIG. 2), the support portions 69L and 69R of the saddle parts 63L and 63R are located in the saddle storage space 24, and the soft cushion portions 70L and 70R are exposed from the peripheral wall of the upper frame 21. In other words, when the seat unit 4 is in the retracted condition, only the seating surfaces 70La and 70Ra of the cushion portions 70L and 70R (See FIGS. 2 and 3) are exposed from the left and right side walls, respectively, and the lateral ends of the saddle storage space 24 are thereby closed.

The seat unit 4 serving as an object support unit for the vehicle 1 is not limited to the one for supporting a rider as disclosed in the illustrated embodiment, but may also be configured to support any object (such as cargo that is to be transported by the user). In such a case, the shape of the saddle 63 can be modified as required depending on the object to be supported.

<Grip Handle>

As shown in FIG. 9, inside an upper wall extending from an upper part of the base main body 61 is provided a retractable grip handle 71 for enabling a user to support the vehicle. A slot 341 extending in the fore and aft direction is formed in a lower part of each of the front and rear ends of the grip handle 71 which receives a pin 342 extending laterally across the upper end of a corresponding leg member 71A. Each leg member 71A is pivotally supported by the base main body 61 via a pivot pin 343 provided in a lower end thereof.

When not in use, the grip handle 71 is received in a handle storage space 72 recessed in the upper wall of the base main body 61 as shown in FIG. 9(A). When the user desires to use the grip handle 71, the front end of the grip handle 71 is pressed downward so as to cause the front end of the grip handle 71 to be pushed downward in the handle storage space 72 as shown in FIG. 9(B). As a result, the rear end of the grip handle 71 is lifted out of the handle storage space 72. The user then grabs the rear end of the grip handle 71 to lift the entire grip handle 71 out of the handle storage space 72 so that the grip handle 71 is placed in the operational position as illustrated in FIG. 9(C). At this time, the two leg members 71A are also raised above the base main body 61 as the pins 342 slide downward along the corresponding slots 341 of the grip handle 71. Then, the user is enabled to lift and transport the vehicle 1 not in operation or support the vehicle 1 not in operation to prevent the vehicle 1 from falling by gripping the grip handle 71.

When the front end of the grip handle 71 is pressed downward by the user as shown in FIG. 9(B), the front end of the grip handle 71 pushes the lever portion 332 of the lock release member 331. As a result, the lock release member 331 is turned around the pin member 334 by the user, and the lock member 315 is released from locking the saddle arms 62L and 62R. Therefore, conveniently, the user is enabled to move the grip handle 71 to the operational position and release the locking of the seat unit 4 by a same operation (or pushing down the front end of the grip handle 71).

<Structure of the Propulsion Unit>

Figure 5:
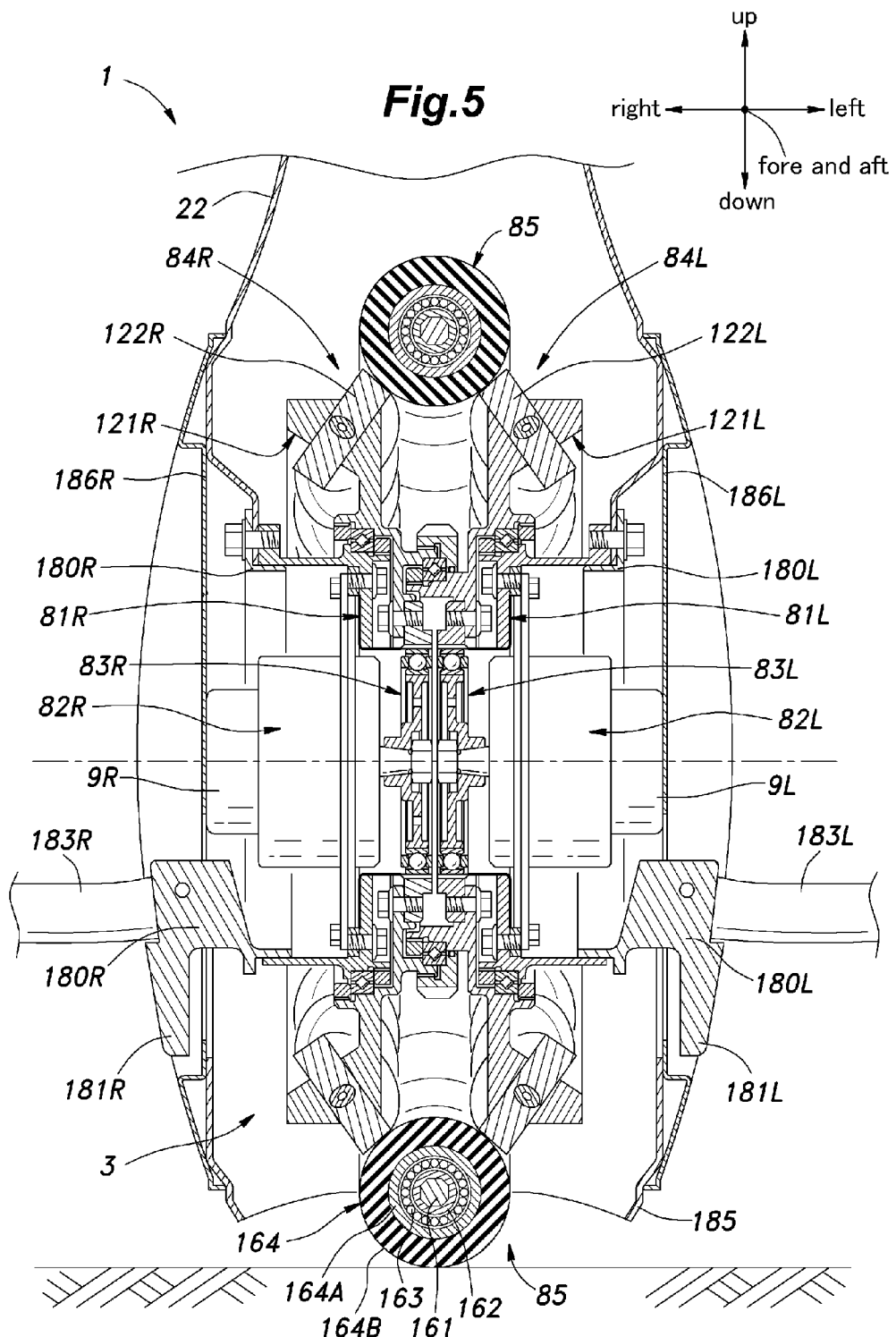
FIG. 5 is a sectional view taken along line V-V of FIG. 1.

As shown in FIGS. 3 to 5, the propulsion unit 3 comprises a pair of mount members 81L and 81R located on either side thereof as support members, a pair of electric motors 82L and 82R mounted on the corresponding mount members 81L and 81R, respectively, a pair of drive members 84L and 84R rotatively actuated by the corresponding electric motors 82L and 82R via wave gear devices 83L and 83R, respectively, and a main wheel 85 rotatively actuated by the drive members 84L and 84R. The electric motors 82L and 82R consisting of DC motors and the wave gear devices 83L and 83R may consist of those with per se known structures. The output of each of the electric motors 82L and 82R is reduced in speed by the corresponding wave gear device 83L, 83R and is then transmitted to the corresponding drive member 84L, 84R (drive disk 121L, 121R).

Each drive member 84L, 84R includes a drive disk 121L, 121R and a plurality of drive rollers 122L, 122R rotatably supported by the corresponding drive disk 121L, 121R. The drive disks 121L and 121R are spaced away from each other by a prescribed distance in the operating condition (or in the assembled condition of the drive members 84L and 84R). The main wheel 85 is interposed between the right and left sets of the drive rollers 122L and 122R.

The main wheel 85 comprises an endless annular member 161 having a polygonal cross section, a plurality of inner sleeves 162 fitted on the circumference of the annular member 161 and a plurality of cylindrical driven rollers 164 rotatably supported around the corresponding inner sleeves 162 via a ball bearing 163. Each driven roller 164 comprises a tubular metallic member 164A fitted on the outer circumference of the corresponding ball bearing 163, and a tubular rubber member 164B vulcanized and fitted on the outer circumferential surface of the corresponding tubular metallic member 164A. The material of the tubular rubber member 164 is not limited to rubber, but may consist of other resilient elastomeric material. The tubular rubber members 164B of the driven rollers 164 engage the road surface when the vehicle 1 is in operation (or traveling)

The driven rollers 164 as well as the inner sleeves 162 are arranged circumferentially along the annular member 161, and define the effective outer circumferential surface of the main wheel 85. Each driven roller 164 is rotatable around the tangential line of the annular member 161 at the point where the driven roller 164 is located.

The main wheel 85 is assembled with the drive members 84L and 84R by being interposed between them. In this state, the outer circumferential surface of the tubular rubber member 164B of each driven roller 164 is engaged by the outer circumferential surfaces of the corresponding drive rollers 122L and 122R so that the rotational force (propelling force) of the drive disks 121L and 121R is frictionally transmitted to the driven rollers 164 of the main wheel 85 via the drive rollers 122L and 122R. For the details of the positional relationship between the drive rollers 122L and 122R and the main wheel 85 and the mode of driving the main wheel 85, references should be made to WO 2008/139740.

<Structure of the Steps>

As shown in FIG. 3, a pair of step bases 180L and 180R are provided on either side wall 33 of the lower frame 22. Each step base 180L, 180R is made of an annular metallic member which extends along the periphery of the semi-circular notch 36 and the two projecting pieces 37 of the corresponding side wall 33. The step bases 180L and 180R and steps 183L and 183R pivotally supported by the step bases 180L and 180R, respectively, jointly form a step unit for supporting the both feet of the rider. The base end of each step 183L, 183R is pivotally supported by a part of the corresponding step base 180L, 180R adjacent to a projecting portion 181L, 181R thereof via a pin extending in the substantially fore and aft direction so that the step 183L, 183R is rotatable between a retracted position (See FIG. 2) where the free end of the step 183L, 183R is located vertically above the base end thereof and the step 183L, 183R extends along the lower frame 22, and a deployed position (See FIG. 1) where the free end of the step 183L, 183R is located laterally outside of the base end thereof and the step 183L, 183R extends laterally outward from the lower frame 22.

Each step base 180L, 180R and the corresponding mount member 81L, 81R are joined to each other with the peripheral part of the notch 36 and the two projecting pieces 37 interposed between them by using threaded bolts. Thereby, the step bases 180L and 180R and the propulsion unit 3 are jointly secured to the lower frame 22.

The strain sensor 8L, 8R is attached to the inner surface of each step base 180L, 180R. Each strain sensor 8L, 8R consists of a per se known strain gauge, and detects the stress of the step base 180L, 180R when a load is applied to the corresponding step 183L, 183R.

The lower end of the lower frame 22 is provided with a lower cover 185 for concealing the lower half of the propulsion unit 3 except for the part thereof engaging the road surface. The outer surface of each side wall 33 of the lower frame 22 is fitted with a side cover 187L, 187R for concealing the step base 180L, 180R while exposing the step 183L, 183R and the projecting portions 181L, 181R.

<Structure of the Electric Unit>

As shown in FIG. 7, the control unit 5 (not shown in FIG. 7) forming the electric unit 11, the load sensor 6 and the tilt sensor 7 are integrally mounted on an electric mount frame 202 serving as a main structural frame. In the following description of the electric unit 11, the fore and aft, lateral and vertical directions are defined with respect to the electric unit 11 as mounted on the lower frame 22.

The electric mount frame 202 essentially consists of a rectangular frame member defining a central opening which is dimensioned so as to rest upon the support bases 53 secured to the corresponding side walls 33 along the side edges thereof. Each side edge of the electric mount frame 202 is provided with a pair of mounting portions 203 formed with through holes 203*a* so as to correspond to threaded holes 54*a* of connecting portions 54 provided in the corresponding support base 53.

The load sensor 6 consists of a tri-axial force sensor that can detect moments around the z-axis (vertical direction), x-axis (fore and aft direction) and y-axis (lateral direction), and includes a body portion 205 receiving a sensor circuit board (not shown in the drawings) therein and fixedly attached to the upper surface of the electric mount frame 202 by using threaded bolts, and an input shaft 206 extending upward from the body portion 205 and formed with a male thread along the length thereof. The body portion 205 rests upon and is fixedly secured to the electric mount frame 202.

The base end of the output shaft 206 is fixedly secured to a planar connecting member base 210. The connecting member base 210 is centrally provided with a threaded hole, and is secured to the input shaft 206 by threading the thread formed around the base end 206B (See FIG. 4) of the input shaft 206 into the threaded hole. A free end of the input shaft 206 projects upward from the connecting member base 210.

With the connecting member base 210 attached to the input shaft 206, a first connector base 211 is attached to a front part of the connecting member base 210 by using threaded bolts, and extends forward. A second connector base 212 is attached to a rear part of the connecting member base 210 by using threaded bolts.

The tilt sensor 7 consists of a per se known gyro sensor, and is secured to the electric mount frame 202 by using threaded bolts inside the electric mount frame 202 which thereby serves as a housing for the tilt sensor 7. The tilt sensor 7 detects the inclination angle relative to the plumb vertical direction.

<Structure of the Battery Unit>

As shown in FIG. 4, the battery unit 10 includes a pair of battery modules 281 and a pair of battery management circuit boards 282. Each battery management circuit board 282 is incorporated with a CPU forming a microcomputer and memory not shown in the drawings. Each battery management circuit board 282 is used for selecting the battery module 281 to be used, and controlling the charge and discharge condition of the battery modules 281.

The battery modules 281 are given with a curved shape with a prescribed curvature so as to conform to the annular interior of the upper frame 21. Therefore, the modules 281 can be passed into the front space 26A and the rear space 26B of the upper frame 21 from a lower opening 25 of the upper frame 21. Once placed inside the upper frame 21, the battery modules 281 are supported from below by a battery bracket 291 which is in turn secured to support bases of the upper frame 21 by using threaded bolts.

Figure 10:
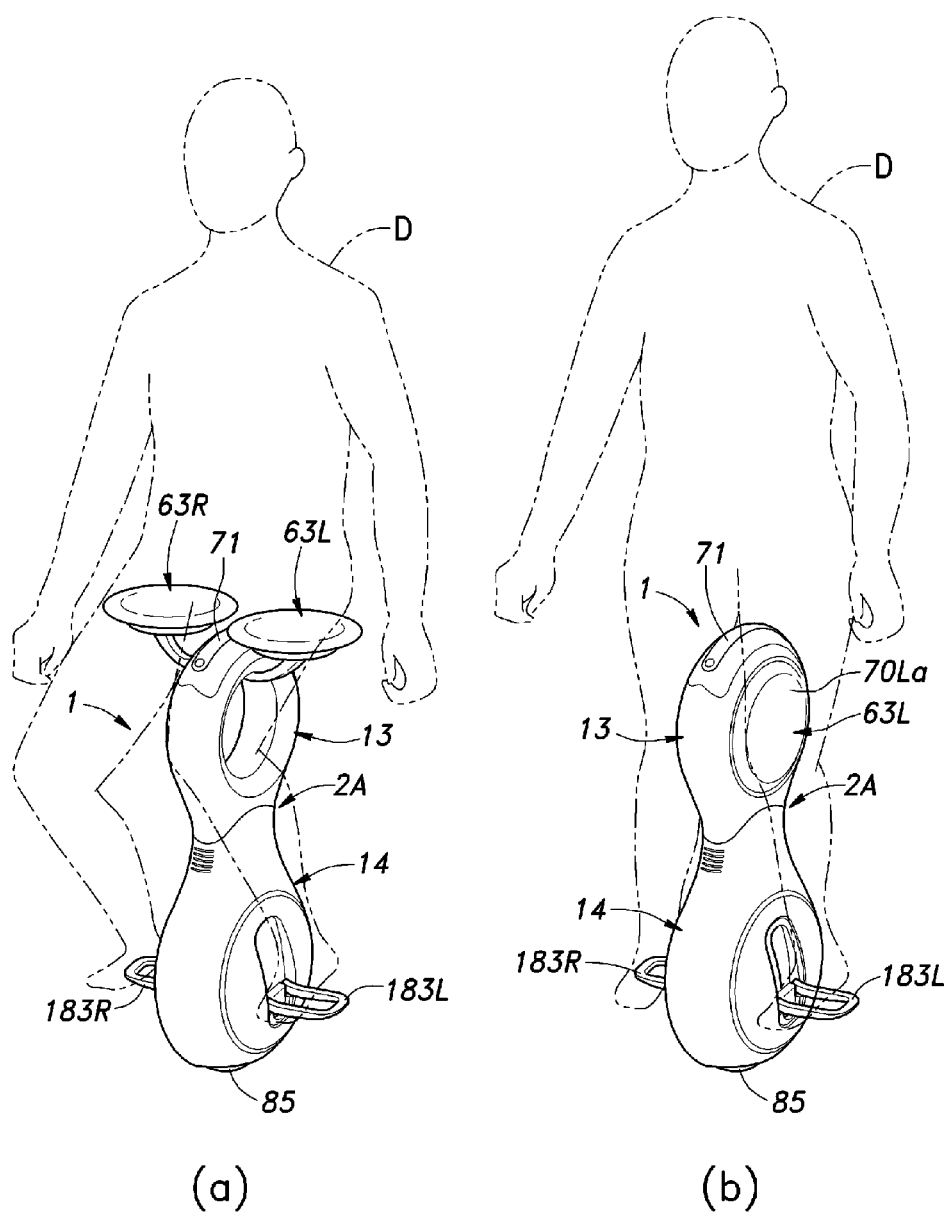
FIGS. 10(A) and 10(B) are views showing a rider seated on the saddle of the inverted pendulum type vehicle, and a rider standing up on the steps of the inverted pendulum type vehicle.

The vehicle 1 having the structure discussed above allows the position of the saddle arms 62L and 62R to be changed (between the deployed position and the retracted position) depending on the need of the user. Therefore, the rider D can ride the vehicle 1 either by sitting on the seat unit 4 as shown in FIG. 10(A) or standing on the steps 183L and 183R while the seat unit 4 is put into the retracted position as shown in FIG. 10(B).

In particular, the rider is enabled to stand up on the vehicle in a stable manner by gripping the seating surfaces 70L*a* and 70L*b* of the saddle parts 63L and 63R that are exposed on either lateral side of the frame 2 with the legs (knees or the thighs) of the rider. As the seating surfaces 70L*a* and 70L*b* that are exposed from the frame 2 are relatively soft, the rider or other surrounding objects can be protected. As the seat unit 4 can be stowed away in the retracted position when not in use, the vehicle 1 can be operated with the user walking beside the vehicle 1 instead of riding thereon or parked without being encumbered by the seat unit 4 so that the convenience and freedom in the use of the vehicle 1 can be enhanced.

Although the present invention has been described in terms of a preferred embodiment thereof, it is obvious to a person skilled in the art that various alterations and modifications are possible without departing from the scope of the present invention. For instance, the inverted pendulum type vehicle of the present invention may also be provided with a plurality of main wheels, instead of only a single main wheel. The load that is applied by the user on the load supporting part of the upper frame is not limited by the seating load applied to the saddle unit, but may also consist of any other load that helps the user to be supported (such as the load that is produced in the case where the inverted pendulum type vehicle is used as a walking cane by the user to assist the user's effort to walk). The seat unit serving as an object support unit according to the present invention is not limited to the saddle unit that is divided into two parts as described above, but may also consist of a one-piece saddle (configured to support the hips of the rider). In such a case, the unitary saddle may be supported by a saddle arm similar to the left or right saddle arm of the two-piece saddle and stored in a saddle storage space (or within the upper frame). The various components of the inverted pendulum type vehicle according to the present invention described above are not necessarily indispensable for the present invention, but may be omitted in a selective manner without departing from the spirit of the present invention.

GLOSSARY

1 inverted pendulum type vehicle
2 frame (base frame)
2A narrowed portion
3 propulsion unit
4 seat unit (object support unit)
5 inverted pendulum control unit
6 load sensor
7 tilt sensor
8L, 8R strain sensor
10 battery unit
11 electric unit
13 upper structure
14 lower structure
21 upper frame
22 lower frame
24 saddle storage space
26 inner space
28 saddle mounting hole
29 connecting recess
30 connecting hole
29 ventilation slot
63L, 63R saddle part
71 grip handle
82L, 82R electric motor
84L, 84R drive member
85 main wheel
183L, 183R step
185 lower cover
186L, 186R side cover
202 electric mount frame
205 body member
206 input shaft
210 connecting member base
246 air passage
281 battery module
282 battery management circuit board

The invention claimed is:

1. An inverted pendulum type vehicle, comprising:
   a base frame supporting a propulsion unit;
   an object support unit mounted on the base frame and configured to support an object; and
   a step unit mounted on the base frame for supporting both feet of a rider;
   wherein:
   the object support unit is moveable between a first position for supporting the object and a second position different from the first position,
   the object support unit comprises a seat unit for supporting hips of the rider,
   the second position consists of a retracted position that stows at least a part of the seat unit in the base frame, the seat unit comprises a seating surface for engaging the hips of the rider, and the seating surface is exposed from a surrounding wall of the base frame when the seat unit is in the retracted position.

2. The inverted pendulum type vehicle according to claim 1, wherein the step unit comprises a left step and a right step extending leftward and rightward from the base frame, respectively, so as to correspond to the left and right feet of the rider, and the seat unit comprises a left saddle part and a right saddle part supporting the left hip and right hip of the rider, respectively, the seating surface of each of the saddle parts being exposed from a corresponding side wall of the base frame when the saddle unit is in the retracted position.

3. An inverted pendulum type vehicle, comprising:
a base frame supporting a propulsion unit; and
an object support unit mounted on the base frame and configured to support an object;
wherein:
the object support unit comprises a seat unit for supporting hips of the rider,
the object support unit is moveable between a first position for supporting the object and a second position different from the first position,
the second position consists of a retracted position that stows at least a part of the seat unit in the base frame,
the seat unit comprises a seating surface for engaging the hips of the rider, and
the seating surface is exposed from a surrounding wall of the base frame when the seat unit is in the retracted position.

* * * * *